United States Patent
Gehtman et al.

(10) Patent No.: US 12,481,734 B2
(45) Date of Patent: Nov. 25, 2025

(54) VERIFYING A USER OF AN INFORMATION HANDLING SYSTEM

(71) Applicant: Dell Products L.P., Round Rock, TX (US)

(72) Inventors: Yevgeni Gehtman, Modi'in (IL); Or Herman-Saffar, Ofakim (IL)

(73) Assignee: Dell Products L.P., Round Rock, TX (US)

( * ) Notice: Subject to any disclaimer, the term of this patent is extended or adjusted under 35 U.S.C. 154(b) by 434 days.

(21) Appl. No.: 17/237,420

(22) Filed: Apr. 22, 2021

(65) Prior Publication Data

US 2022/0342963 A1 Oct. 27, 2022

(51) Int. Cl.
| | | |
|---|---|---|
| G06F 21/31 | (2013.01) | |
| G06F 21/45 | (2013.01) | |
| G06F 21/60 | (2013.01) | |
| G06N 20/00 | (2019.01) | |
| H04L 9/40 | (2022.01) | |

(52) U.S. Cl.
CPC .............. *G06F 21/31* (2013.01); *G06F 21/45* (2013.01); *G06F 21/602* (2013.01); *G06N 20/00* (2019.01); *H04L 63/0876* (2013.01)

(58) Field of Classification Search
CPC ........ G06F 21/31; G06F 21/45; G06F 21/602; G06F 21/604; G06F 21/60; G06F 21/50; G06F 21/30; G06F 21/44; G06F 21/32; G06F 21/316; G06N 20/00; H04L 63/0876; H04L 63/102; H04L 63/105; H04L 63/10

See application file for complete search history.

(56) References Cited

U.S. PATENT DOCUMENTS

| | | | | |
|---|---|---|---|---|
| 9,824,199 | B2* | 11/2017 | Kshirsagar | H04L 63/0861 |
| 11,133,929 | B1* | 9/2021 | Shahidzadeh | H04L 9/0891 |
| 11,201,862 | B1* | 12/2021 | Prasad | G06Q 20/10 |
| 11,210,382 | B1* | 12/2021 | Davey | G06F 21/42 |
| 11,210,412 | B1* | 12/2021 | Ghetti | H04L 63/083 |
| 11,374,927 | B1* | 6/2022 | Kaditz | H04L 67/125 |
| 11,507,645 | B1* | 11/2022 | Hawes | H04L 67/306 |

(Continued)

*Primary Examiner* — Tae K Kim
(74) *Attorney, Agent, or Firm* — McDermott Will & Schulte LLP

(57) ABSTRACT

In one embodiment, a method for verifying a user of an information handling system that includes: identifying, by a verification manager of an information handling system of a computing environment, one or more components of the information handling system; generating, by the verification manager, a static indicator associated with the information handling system based on the one or more components; verifying, by the verification manager, the static indicator; identifying, by the verification manager, the user of the information handling system; identifying, by the verification manager, a plurality of behavioral characteristics associated with the user; generating, by the verification manager, a dynamic indicator associated with the user based on the plurality of behavioral characteristics; verifying, by the verification manager, the dynamic indicator; determining, by the verification manager, a user accessibility associated with the information handling system based on the static indicator and the dynamic indicator.

14 Claims, 3 Drawing Sheets

(56) References Cited

U.S. PATENT DOCUMENTS

| | | | |
|---|---|---|---|
| 11,666,829 B1* | 6/2023 | Rao | A63F 13/792 |
| | | | 463/29 |
| 2011/0162046 A1* | 6/2011 | Forster | G06F 21/41 |
| | | | 726/4 |
| 2013/0167207 A1* | 6/2013 | Davis | G06F 21/316 |
| | | | 726/5 |
| 2016/0006730 A1* | 1/2016 | Chari | G06F 21/32 |
| | | | 726/7 |
| 2016/0149881 A1* | 5/2016 | Rengan | H04L 63/107 |
| | | | 726/7 |
| 2020/0274860 A1* | 8/2020 | Sherif | G06N 20/00 |
| 2021/0103644 A1* | 4/2021 | Madishetti | H04W 12/61 |
| 2022/0188390 A1* | 6/2022 | Lee | G06N 3/04 |
| 2022/0201008 A1* | 6/2022 | Stergioudis | G06N 20/00 |
| 2022/0261466 A1* | 8/2022 | Gelardi | H04L 9/3231 |
| 2022/0350870 A1* | 11/2022 | Qin | G06F 21/32 |
| 2023/0035104 A1* | 2/2023 | Cheng | G06F 21/35 |
| 2023/0051980 A1* | 2/2023 | Tammannagari | G06F 21/32 |

* cited by examiner

VERIFYING A USER OF AN INFORMATION HANDLING SYSTEM

BACKGROUND

Field of the Disclosure

The disclosure relates generally to information handling systems, and in particular to verifying a user of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for verifying a user of an information handling system includes: identifying, by a verification manager of an information handling system of a computing environment, one or more components of the information handling system; generating, by the verification manager, a static indicator associated with the information handling system based on the one or more components; verifying, by the verification manager, the static indicator; identifying, by the verification manager, the user of the information handling system; identifying, by the verification manager, a plurality of behavioral characteristics associated with the user; generating, by the verification manager, a dynamic indicator associated with the user based on the plurality of behavioral characteristics; verifying, by the verification manager, the dynamic indicator; determining, by the verification manager, a user accessibility associated with the information handling system based on the static indicator and the dynamic indicator.

In one or more of the disclosed embodiments, verifying the static indicator includes: accessing, by the verification manager, a static inventory database of a management backend of the computing environment, the static inventory database storing a plurality of verified static indicators associated with a plurality of information handling systems of the computing environment; identifying, by the verification manager, a verified static indicator associated with the information handling system from the plurality of verified static indicators, the verified static indicator indicating a plurality of verified components of the information handling system; determining, by the verification manager, that the static indicator matches the verified static indicator; and indicating, by the verification manager, that the static indicator is verified.

In one or more of the disclosed embodiments, verifying the static indicator includes: accessing, by the verification manager, a static inventory database of a management backend of the computing environment, the static inventory database storing a plurality of verified static indicators associated with a plurality of information handling systems of the computing environment; identifying, by the verification manager, a verified static indicator associated with the information handling system from the plurality of verified static indicators, the verified static indicator indicating a plurality of verified components of the information handling system; determining, by the verification manager, that the static indicator does not match the verified static indicator; indicating, by the verification manager, that the static indicator is not verified; and executing, by the verification manager, an encryption service to encrypt a local storage resource of the information handling system.

In one or more of the disclosed embodiments, verifying the dynamic indicator includes: executing, by the verification manager, a machine learned model using the dynamic indicator as an input; generating, by the machine learned model, an output score indicating a likelihood that the user is a verified user of the information handling system; determining, by the verification manager, that the output score is above a threshold output score; and indicating, by the verification manager, that the dynamic indicator is verified.

In one or more of the disclosed embodiments, verifying the dynamic indicator includes: executing, by the verification manager, a machine learned model using the dynamic indicator as an input; generating, by the machine learned model, an output score indicating a likelihood that the user is a verified user of the information handling system; determining, by the verification manager, that the output score is below a threshold output score; indicating, by the verification manager, that the dynamic indicator is not verified; and executing, by the verification manager, an encryption service to encrypt a local storage resource of the information handling system.

In one or more of the disclosed embodiments, determining the user accessibility associated with the information handling system based on the static indicator and the dynamic indicator includes: identifying, by the verification manager, that the static indicator and the dynamic indicator have been verified; and causing, by the verification manager, the information handling system to allow a user access for the user.

In one or more of the disclosed embodiments, determining the user accessibility associated with the information handling system based on the static indicator and the dynamic indicator includes: identifying, by the verification manager, that at least one of the static indicator and the dynamic indicator has not been verified; and causing, by the verification manager, the information handling system to restrict a user access for the user.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
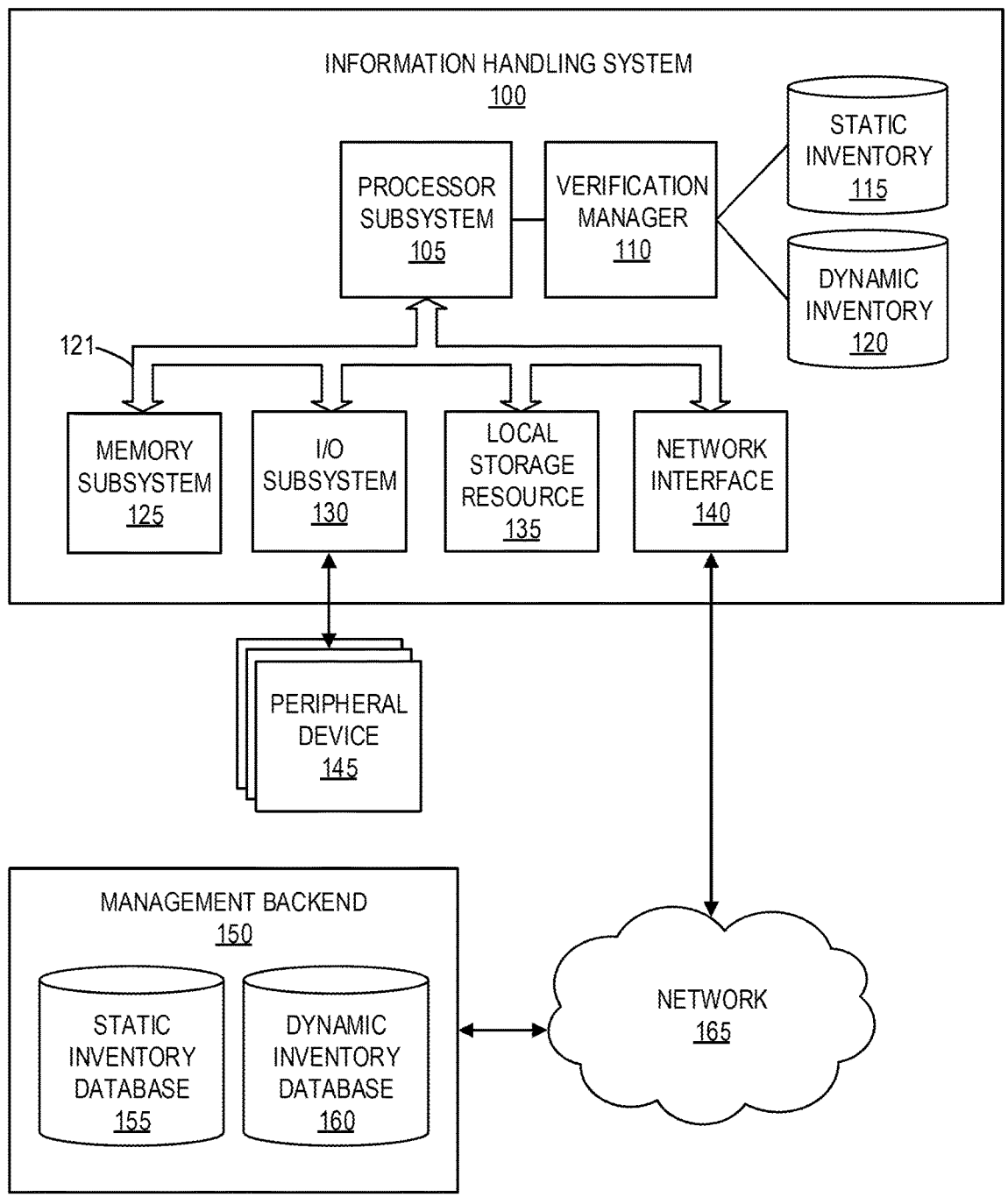
FIG. 1 is a block diagram of selected elements of an embodiment of a computing environment that includes an information handling system and a management backend.

This document describes a method for verifying a user of an information handling system that includes: identifying, by a verification manager of an information handling system of a computing environment, one or more components of the information handling system; generating, by the verification manager, a static indicator associated with the information handling system based on the one or more components; verifying, by the verification manager, the static indicator; identifying, by the verification manager, the user of the information handling system; identifying, by the verification manager, a plurality of behavioral characteristics associated with the user; generating, by the verification manager, a dynamic indicator associated with the user based on the plurality of behavioral characteristics; verifying, by the verification manager, the dynamic indicator; determining, by the verification manager, a user accessibility associated with the information handling system based on the static indicator and the dynamic indicator.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
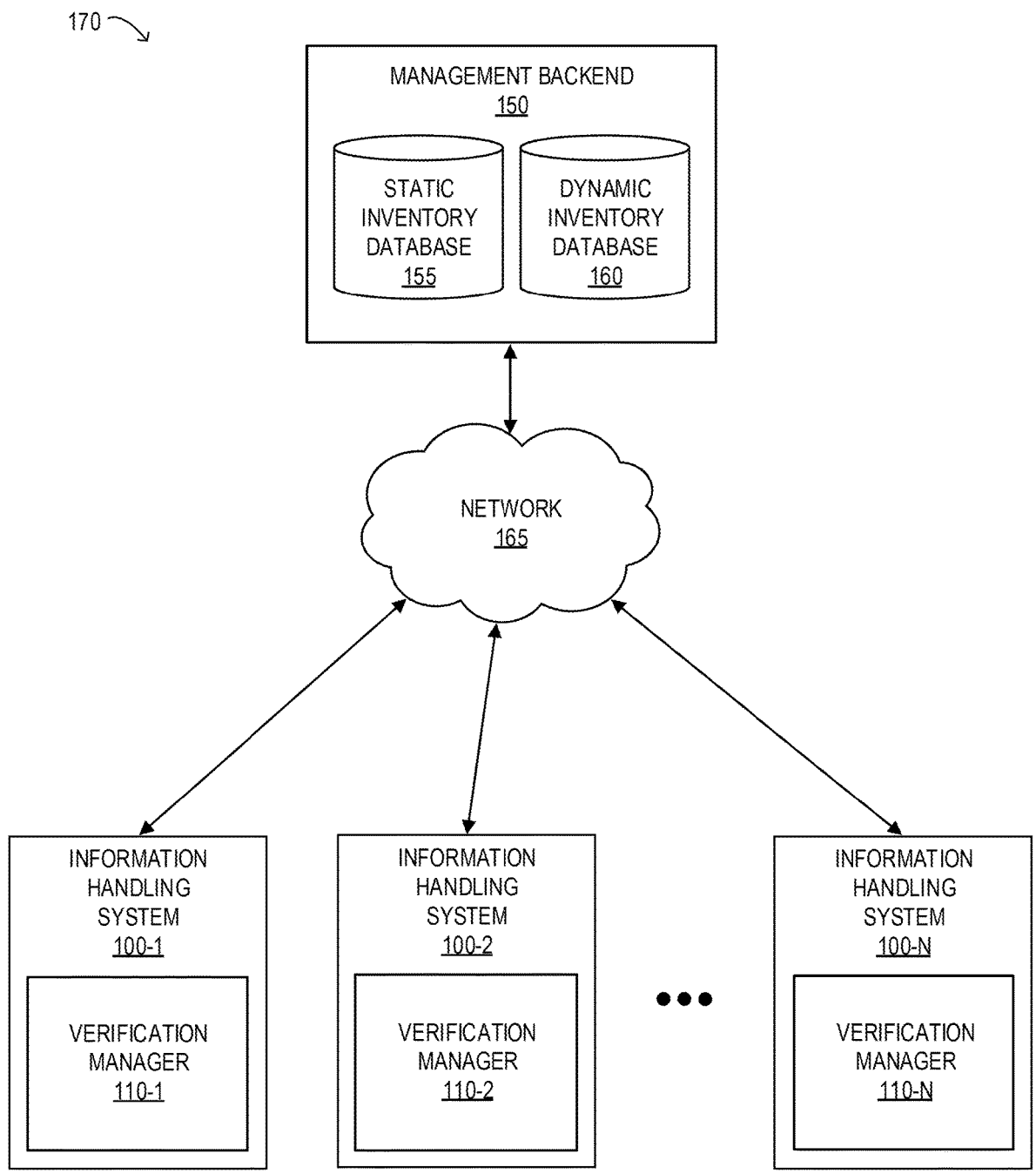
FIG. 2 is a block diagram of selected elements of an embodiment of a computing environment that includes a plurality of information handling systems and a management backend.
Figure 3:
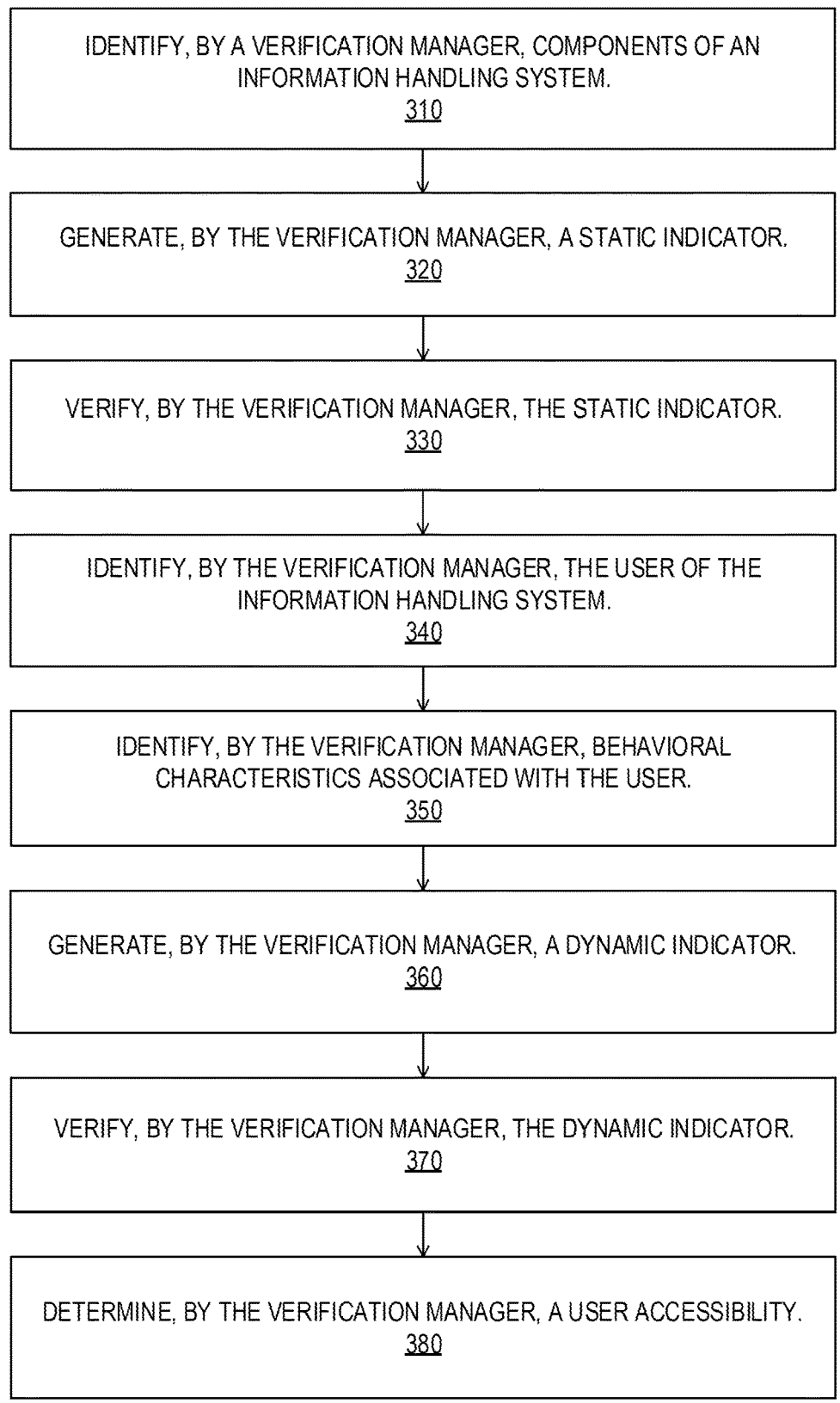
FIG. 3 is a flowchart depicting selected elements of an embodiment of a method for verifying a user of an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system and a management backend. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 125, an I/O subsystem 130 communicably coupled to one or more peripheral devices 145, a local storage resource 135, and a network interface 140. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a verification manager 110, a static inventory 115, and a dynamic inventory 120. In other embodiments, computing environment 170 may include additional, fewer, and/or different components than the components illustrated in FIG. 1.

In information handling system 100, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 125 and/or another component of information handling system 100). In the same or alternative embodiments, processor subsystem 105 may interpret and/or execute program instructions and/or process data stored remotely. In one embodiment, processor subsystem 105 may be or include a multi-core processor comprised of one or more processor cores disposed upon an integrated circuit (IC) chip. In other embodiments, processor subsystem 105 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 125 may comprise a system, device, or apparatus operable to retain and/or retrieve program instructions and/or data for a period of time (e.g., computer-readable media). Memory subsystem 125 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 130 may comprise a system, device, or apparatus generally operable to receive and/or transmit data to, from, and/or within information handling system 100. I/O subsystem 130 may represent, for example, a variety of communication interfaces, graphics interfaces, video interfaces, user input interfaces, and/or peripheral interfaces. In various embodiments, I/O subsystem 130 may be used to support various peripheral devices, such as a touch panel, a display adapter, a keyboard, an accelerometer, a touch pad, a gyroscope, an IR sensor, a microphone, a sensor, a camera, or another type of peripheral device. In the embodiment illustrated in FIG. 1, I/O subsystem 130 may be used to support peripheral devices 145.

In one embodiment, local storage resource 135 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 140 may be a suitable system, apparatus, or device operable to serve as an interface between information handling system 100 and a network 165. Network interface 140 may enable information handling system 100 to communicate over network 165 using a suitable transmission protocol and/or standard, including, but not limited to, transmission protocols and/or standards enumerated below with respect to the discussion of network 165. Network 165 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 140 may enable wired and/or wireless communications (e.g., NFC or Bluetooth) to and/or from information handling system 100.

In particular embodiments, network 165 may include one or more routers for routing data between client information handling systems 100 and server information handling systems 100. A device (e.g., a client information handling system 100 or a server information handling system 100) on network 165 may be addressed by a corresponding network address including, for example, an Internet protocol (IP) address, an Internet name, a Windows Internet name service (WINS) name, a domain name or other system name. In particular embodiments, network 165 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 165 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165 and its various components may be implemented using hardware, software, or any combination thereof.

In one embodiment, static inventory 115 may be a suitable system, apparatus, or device operable to store information describing one or more components of information handling system 100. In particular, static inventory 115 may be or include a repository used to store information describing various properties (e.g., device type, manufacturer, device description, and the like) associated with one or more components communicably coupled to, or otherwise installed on, information handling system 100. In one embodiment, verification manager 110 may identify the one or more components (e.g., at a kernel level), determine the various properties of the one or more components, and may store information describing the various properties in static inventory 115. For example, static inventory 115 may store information describing a cache size, clock speed, make, model, serial number, socket type, host-bus speed, and/or other properties associated with processor subsystem 105 of information handling system 100. In another example, static inventory 115 may store information describing a storage capacity, data access performance, physical form factor, serial number, and/or other various properties associated with local storage resource 135. Other examples of information stored in static inventory 115 may include information describing a basic input/output system (BIOS) serial number, a media access control (MAC) address associated with each of the one or more components, a graphics processing unit (GPU) serial number, an internet protocol (IP) address associated with information handling system 100, a random-access memory (RAM) part number, and/or any other information suitable for describing one or more components of information handling system 100. In one embodiment, static inventory 115 may be or include a relational database in which one or more component descriptions and associated properties are stored as entries within a list. In other embodiments, static inventory 115 may be or include a centralized database, distributed database, commercial database, operational database, and/or any other database management system suitable for storing information describing one or more components of information handling system 100.

In one embodiment, each peripheral device 145 (collectively referred to herein as "peripheral devices 145") may be a suitable system, apparatus, or device operable to capture input from a user, or users, of information handling system 100. In particular, each peripheral device 145 may be or include an I/O hardware device (e.g., communicably coupled to I/O subsystem 130) operable to capture input from a user, or users, of information handling system 100. In one embodiment, verification manager 110 may use the input captured by peripheral device 145, in part, to identify one or more dynamic user attributes, or "behavioral characteristics," associated with a user, or users, of information handling system 100. That is, peripheral device 145 may capture input from a user of information handling system 100 such that verification manager 110 may identify behavioral characteristics associated with the user based on how the user interacts with, or otherwise provides input to, information handling system 100. In this embodiment, verification manager 110 may store information describing the behavioral characteristics associated with a user, or users, of information handling system 100 in dynamic inventory 120.

In one embodiment, peripheral device 145 may be or include an image sensor operable to receive and convert images into electrical signals. In particular, peripheral device 145 may be or include an image sensor configured to convert light into electrons such that information handling system 100 may use the electrons to process a digital image. In one embodiment, peripheral device 145 may include facial recognition and/or eye-tracking capabilities such that verification manager 110 may identify behavioral characteristics associated with a user, or users, of information handling system 100. For example, peripheral device 145 may be or include a webcam operable to capture one or more images of a user, or users, of information handling system 100. Here, verification manager 110 may use eye and/or facial tracking data from the one or more images of a user to identify a viewing angle of the user in relation to information handling system 100, a viewing position of the user in relation to information handling system 100, a gaze direction of the user, a frequency or specific pattern in which the user blinks while using information handling system 100, and/or any other behavioral characteristics associated with a user, or users, of information handling system 100. In one embodiment, peripheral device 145 may be equipped with a standard complementary metal oxide semiconductor (CMOS) sensor through which color images of a user and/or user environment are acquired, for example, such as that of a red, green, blue (RGB) camera. In other embodiments, image sensor 200 may be or include a thermographic camera, infrared (IR) camera, and/or any combination of image sensors suitable for capturing one or more images of the user.

In one embodiment, peripheral device 145 may be or include an audio sensor operable to capture an audio stream of a user, or users, of information handling system 100. In this embodiment, the audio stream captured by peripheral device 145 may be used by verification manager 110 to identify behavioral characteristics associated with the user, or users, of information handling system 100. For example, peripheral device 145 may be or include a microphone operable to capture an audio stream of a user seated in front of information handling system 100 that may include sounds of the user working, such as sounds of the user typing on a keyboard and/or participating in a conference call. Here, verification manager 110 may perform speech recognition and/or vocal analysis using the audio stream of the user to determine a cadence in which the user speaks, an inflection with which the user speaks, a specific phonation, pitch, and/or loudness associated with the user's voice, and/or any other behavioral characteristics associated with the user, or users, of information handling system 100. In one embodiment, peripheral device 145 may be or include a dynamic microphone communicatively coupled to information handling system 100. In other embodiments, peripheral device 145 may be or include a microelectromechanical systems (MEMS) microphone, a dynamic universal serial bus (USB) microphone, and/or any combination of audio sensors suitable for capturing an audio stream of a user.

In one embodiment, peripheral device 145 may be or include an I/O hardware device operable to receive input from a user, or users, via one or more mechanical mechanisms. For example, peripheral device 145 may be or include a keyboard communicably coupled to information handling system 100 to receive input from the user, or users in the form of keystrokes applied to individual keys disposed on a surface of the keyboard. Here, verification manager 110 may monitor the keystrokes received from the user to determine a typing speed (e.g., words per minute) of the user, a velocity sensitivity (i.e., indicating a speed with which the keys are pressed by the user), a pressure sensitivity (i.e., indicating a pressure with which a key is held down by the user after being pressed), common words and/or phrases typed by the user, and/or any other behavioral characteristics associated with the user, or users, of information handling system 100. In another example, peripheral device 145 may be or include a computer mouse communicably coupled to information handling system 100 to receive input from the user, or users, in the form of lateral movements of the computer mouse and/or clicks applied to one or more buttons disposed on a surface of the computer mouse. Here, verification manager 110 may monitor the lateral movements and/or clicks received from the user to determine a velocity with which the user applies a lateral force to move the computer mouse, a velocity sensitivity (i.e., indicating a speed with which the one or more buttons are clicked), a pressure sensitivity (i.e., indicating a pressure with which the one or more buttons are held down by the user after being clicked), and/or any other behavioral characteristics associated with the user, or users, of information handling system 100. In yet another example, verification manager 110 may monitor, both, keystrokes received from a user via keyboard and lateral movements and/or clicks received from the user via computer mouse to correlate a general usage profile and determine behavioral characteristics associated with the user, or users, of information handling system 100 based on the usage profile. In other embodiments, peripheral device 145 may be or include one or more biometric devices (e.g., finger printers, retinal scanners, and the like), storage devices (e.g., external hard drive, USB flash drive, and the like), output devices (e.g., computer monitors, printers, and the like), and/or any other I/O hardware device operable to capture input and/or present output to a user, or users, of information handling system 100.

In one embodiment, dynamic inventory 120 may be a suitable system, apparatus, or device operable to store information describing behavioral characteristics associated with a user, or users, of information handling system 100. In particular, dynamic inventory 120 may be or include a repository used to store information describing various behavioral characteristics identified by verification manager 110. In one embodiment, verification manager 110 may identify behavioral characteristics based on input captured by peripheral device 145. Specifically, peripheral device 145 may capture input from a user of information handling system 100 such that verification manager 110 may identify behavioral characteristics associated with the user based on how the user interacts with, or otherwise provides input to, information handling system 100. Here, examples of information describing behavioral characteristics stored in dynamic inventory 120 may include a viewing angle of the user, a viewing position of the user, a gaze direction of the user, a frequency or specific pattern in which the user blinks, a cadence and/or inflection with which the user speaks, a specific phonation, pitch, and/or loudness associated with the user's voice, a typing speed, a velocity sensitivity and/or pressure sensitivity with which the user provides input to a keyboard and/or computer mouse, common words and/or phrases typed by the user, a velocity with which the user applies a lateral force to move a computer mouse, and the like.

In one embodiment, verification manager 110 may identify behavioral characteristics based on a usage of information handling system 100 (e.g., during one or more user sessions). In this embodiment, examples of information describing behavioral characteristics stored in dynamic inventory 120 may include a Rivest, Shamir, Adleman (RSA) software token identifier (ID), a virtual private network (VPN) ID, an internet browsing history, a record of network activity (i.e., average data sent per day, week, month, and the like), a record of hardware activity (i.e., CPU, GPU, and/or storage device usage), a record of various files accessed, a record of logins, and the like. In one embodiment, dynamic inventory 120 may be or include a relational database in which behavioral characteristics associated with a user, or users, of information handling system 100 are stored as entries within a list. In other embodiments, dynamic inventory 120 may be or include a centralized database, distributed database, commercial database, operational database, and/or any other database management system suitable for storing information describing behavioral characteristics associated with a user, or users, of information handling system 100.

In computing environment 170, management backend 150 may be a suitable system, apparatus, or device operable to provide an interface through which a user may communicate with information handling system 100. Specifically, management backend 150 may be or include an information handling system communicably coupled to information handling system 100 via network 165 such that a user (e.g., an administrator) of management backend 150 may remotely access and monitor physical parameters of information handling system 100 (e.g., power supply voltage, fan speed, humidity, ambient temperature, and the like). In one embodiment, management backend 150 may access one or more devices, buses, and/or portions of information handling system 100. In particular, management backend 150 may access one or more devices, buses, and/or portions of information handling system 100 via network 165 to perform a management information exchange with information handling system 100. In one embodiment, the management information exchange may be based at least on an Intelligent Platform Management Interface (IPMI) standard. For example, management backend 150 may permit utilization of IPMI out-of-band interfaces such as IPMI Over LAN (local area network). In another example, the management information exchange may be based on a Redfish standard. In the embodiment illustrated in FIG. 1, management backend 150 includes a static inventory database 155 and a dynamic inventory database 160.

In one embodiment, verification manager 110 may be a suitable system, apparatus, or device operable to verify a user, or users, of information handling system 100. In particular, verification manager 110 may be or include a software agent comprised of software instructions that may be executed by information handling system 100 (e.g., processor subsystem 105) to verify a user, or users, of information handling system 100. Conventional information handling systems may verify users by requiring the users to enter user credentials in the form of a password, biometric ID, RSA software token ID, and the like. Once user credentials have been successfully entered, conventional information handling systems may provide users with access to various sensitive files and/or proprietary resources stored within, or otherwise made available through, the information handling systems. However, such verification of users may make conventional information handling systems vulnerable to malicious cybercrime or attack for instances in which user credential integrity may be compromised. For example, a cybercriminal may nefariously gain access to a list of user credentials associated with a business enterprise. Once accessed, the cybercriminal may enter the user credentials into a conventional information handling system affiliated with the business enterprise to breach access to sensitive documents, records, and/or proprietary resources without restriction.

In contrast, verification manager 110 may verify users of information handling system 100 by generating and verifying, both, a unique identifier of one or more components of information handling system 100, or a "static indicator," and a unique identifier of behavioral characteristics associated with users of information handling system 100, or a "dynamic indicator." That is, verification manager 110 may require verification of both static and dynamic indicators in order to allow a user, or users, of information handling system 100 to remain in a user session, or user sessions. Here, if a static indicator and/or dynamic indicator cannot be successfully verified, verification manager 110 may cause various sensitive files and/or proprietary resources stored within, or otherwise made available through, information handling system 100 to be encrypted, or otherwise indecipherable, thereby disallowing access to users. In this way, verification manager 110 may ensure that, both, static parameters (i.e., one or more components installed on information handling system 100) and dynamic parameters (i.e., how a user interacts with, or otherwise provides input to, information handling system 100) are properly verified, thereby providing a holistic solution to cybersecurity issues encountered by conventional information handling systems that rely on user credentials alone.

In one embodiment, verification manager 110 may identify one or more components of information handling system 100. In particular, verification manager 110 may access one or more components (e.g., hardware devices) installed on, or otherwise available to, information handling system 100 on a kernel level and may gather information describing various properties (e.g., device type, manufacturer, device description, and the like) associated with the one or more components. Examples of information describing the one or more components may include information describing a BIOS serial number, a MAC address associated with each of the one or more components, a GPU serial number, an IP address associated with information handling system 100, a RAM part number, and/or any other information suitable for describing one or more components of information handling system 100. In one embodiment, verification manager 110 may store the information describing one or more components in static inventory 115. In another embodiment, verification manager 110 may additionally store the information describing one or more components in static inventory database 155 of management backend 150. In this embodiment, each information handling system communicably coupled to management backend 150 via network 165 may store information describing one or more components in static inventory database 155 such that static inventory database 155 may store a complete inventory of components in computing environment 170.

In one embodiment, verification manager 110 may generate a static indicator associated with information handling system 100 based on the one or more components. In particular, verification manager 110 may generate a static indicator based on the gathered information describing the one or more components of information handling system 100. In one embodiment, verification manager 110 may access static inventory 115 to identify the previously gathered information describing the one or more components stored therein. In another embodiment, verification manager 110 may simply take inventory of the one or more components installed on, or otherwise available to, information handling system 100 and gather the information describing the one or more components in real-time. The static indicator generated by verification manager 110 may serve as a unique identifier of the one or more components of information handling system 100. That is, the specific combination, or collection, of information describing each of the one or more components identified by verification manager 110 may be unique to information handling system 100 and may be used to identify information handling system 100. In one embodiment, verification manager 110 may store the generated static indicator in static inventory 115. In another embodiment, verification manager 110 may additionally store the static indicator in static inventory database 155 of management backend 150. In this embodiment, the static indicator stored in static inventory database 155 may be verified (e.g., by an administrator or microservice of management backend 150) to yield a trusted inventory, or a "verified static indicator," of the one or more components installed on, or otherwise available to, information handling system 100. In this embodiment, each information handling system communicably coupled to management backend 150 via network 165 may store respective static indicators in static inventory database 155 such that management backend 150 may verify the static indicators and may store a complete listing of verified static indicators associated with information handling systems in computing environment 170.

In one embodiment, verification manager 110 may verify the static indicator. Specifically, verification manager 110 may access static inventory database 155 of management backend 150 to verify the static indicator. As described above, static inventory database 155 may store a complete listing of verified static indicators associated with information handling systems in computing environment 170. To verify the static indicator, verification manager 110 may identify a verified static indicator associated with information handling system 100 from the complete listing of verified static indicators. Here, the verified static indicator associated with information handling system 100 may indicate one or more verified components of information handling system 100. For example, an administrator or microservice of management backend 150 may verify each of the one or more components indicated in the static indicator generated by verification manager 110 and stored in management backend 150. In another example, an administrator or microservice of management backend 150 may access a static indicator stored in static inventory 115 of information handling system 100 via network 165 to retrieve the static indicator, store the static indicator in static inventory database 155, and verify the static indicator accordingly.

Once verification manager 110 identifies the verified static indicator associated with information handling system 100, verification manager 110 may determine whether the static indicator (i.e., generated by verification manager 110 and stored in static inventory 115) matches the verified static indicator (i.e., verified by an administrator or microservice and stored in static inventory database 155). That is, verification manager 110 may ensure that the specific combination, or collection, of information describing each of the one or more components described in the static indicator matches the specific combination, or collection, of information describing each of the one or more verified components described in the verified static indicator. If verification manager 110 determines that the static indicator matches the verified static indicator, verification manager 110 may indicate that the static indicator is verified. For example, verification manager 110 may set a flag in static inventory 115 indicating that the static indicator stored therein has been verified and may be trusted. In contrast, if verification manager 110 determines that the static indicator does not match the verified static indicator, verification manager 110 may indicate that the static indicator is not verified and may cause one or more mitigating events to occur in information handling system 100. For example, verification manager 110 may cause various sensitive files and/or proprietary resources stored within, or otherwise made available through, information handling system 100 to be encrypted, or otherwise indecipherable, thereby disallowing access to users.

In one embodiment, verification manager 110 may identify the user, or users, of information handling system 100. In particular, verification manager 110 may identify user credentials entered by a user, or users, of information handling system 100. Examples of user credentials entered by a user, or users, may be or include a password, biometric ID, RSA software token ID, and/or a username of the user, or users, logged in to information handling system 100. In one embodiment, user credentials may be or include an employee identification number, a user profile identification number, and/or any other identification used to identify the user, or users, of information handling system 100.

Once the user, or users, of information handling system 100 has been identified, verification manager 110 may identify behavioral characteristics associated with the user, or users. In one embodiment, verification manager 110 may identify behavioral characteristics based on input captured by peripheral device 145. In particular, peripheral device 145 may capture input from a user of information handling system 100 such that verification manager 110 may identify behavioral characteristics associated with the user based on how the user interacts with, or otherwise provides input to, information handling system 100. For example, verification manager 110 may identify a viewing angle of the user, a viewing position of the user, a gaze direction of the user, a frequency or specific pattern in which the user blinks, a cadence and/or inflection with which the user speaks, a specific phonation, pitch, and/or loudness associated with the user's voice, a typing speed, a velocity sensitivity and/or pressure sensitivity with which the user provides input to a keyboard and/or computer mouse, common words and/or phrases typed by the user, a velocity with which the user applies a lateral force to move a computer mouse, and/or any other information suitable for describing behavioral characteristics of a user, or users, of information handling system 100.

In one embodiment, verification manager 110 may identify behavioral characteristics based on a usage of information handling system 100 (e.g., during one or more user sessions). In this embodiment, examples of information describing behavioral characteristics identified by verification manager 110 may include an RSA software token ID, a VPN ID, an internet browsing history, a record of network activity (i.e., average data sent per day, week, month, and the like), a record of hardware activity (i.e., CPU, GPU, and/or storage device usage), a record of various files accessed, a record of logins, and/or any other information suitable for describing behavioral characteristics of a user, or users, of information handling system 100. In one embodiment, verification manager 110 may store the information describing behavioral characteristics in dynamic inventory 120. In another embodiment, verification manager 110 may additionally store the information describing behavioral characteristics in dynamic inventory database 160 of management backend 150. In this embodiment, each information handling system communicably coupled to management backend 150 via network 165 may store information describing behavioral characteristics in dynamic inventory database 160 such that dynamic inventory database 160 may store a complete inventory of behavioral characteristics associated with each user in computing environment 170.

In one embodiment, verification manager 110 may generate a dynamic indicator associated with the user of information handling system 100. In particular, verification manager 110 may generate a dynamic indicator based on the behavioral characteristics associated with the user. In one embodiment, verification manager 110 may access dynamic inventory 120 to identify the previously gathered information describing the behavioral characteristics of the user, or users, stored therein. In another embodiment, verification manager 110 may simply monitor input from the user, or users, captured by peripheral device 145 and/or a usage of information handling system 100 during a user session and gather the information describing behavioral characteristics in real-time. The dynamic indicator generated by verification manager 110 may serve as a unique identifier of the behavioral characteristics associated with the user, or users, of information handling system 100. That is, the specific combination, or collection, of information describing each of the behavioral characteristics identified by verification manager 110 may be unique to the user, or users, of information handling system 100 and may be used to identify the user, or users. In one embodiment, verification manager 110 may store the generated dynamic indicator in dynamic inventory 120. In another embodiment, verification manager 110 may additionally store the dynamic indicator in dynamic inventory database 160 of management backend 150. In this embodiment, the dynamic indicator stored in dynamic inventory database 160 may be verified (e.g., by a machine learned model) to yield a trusted inventory of behavioral characteristics associated with each user, or "verified users," of information handling system 100. In this embodiment, each information handling system communicably coupled to management backend 150 via network 165 may store respective dynamic indicators in dynamic inventory database 160 such that management backend 150 may verify the dynamic indicators and may store a complete listing of verified users in computing environment 170.

In one embodiment, verification manager 110 may verify the dynamic indicator. In particular, verification manager 110 may execute a machine learned model using the dynamic indicator as input. The machine learned model may have been previously trained by verification manager 110 during a training period spanning a given time interval (e.g., two weeks, one month, one year, and the like). During the training period, a user of information handling system 100 may be required to use information handling system 100 such that verification manager 110 may monitor how the user interacts with, or otherwise provides input to, information handling system 100. For example, during the training period, verification manager 110 may identify a viewing angle of the user, a viewing position of the user, a gaze direction of the user, a frequency or specific pattern in which the user blinks, a cadence and/or inflection with which the user speaks, a specific phonation, pitch, and/or loudness associated with the user's voice, a typing speed, a velocity sensitivity and/or pressure sensitivity with which the user provides input to a keyboard and/or computer mouse, common words and/or phrases typed by the user, a velocity with which the user applies a lateral force to move a computer mouse, and/or any other information suitable for describing behavioral characteristics of a user, or users, of information handling system 100. In another example, during the training period, verification manager 110 may identify an RSA software token ID, a VPN ID, an internet browsing history, a record of network activity (i.e., average data sent per day, week, month, and the like), a record of hardware activity (i.e., CPU, GPU, and/or storage device usage), a record of various files accessed, a record of logins, and/or any other information suitable for describing behavioral characteristics of a user, or users, of information handling system 100.

In one embodiment, the behavioral characteristics identified by verification manager 110 during the training period may serve as baseline behavior to which subsequent user behavior may be compared. For example, the machine learned model executed by verification manager 110 may be or include a probabilistic Gaussian Mixture Model (GMM) that captures statistical parameters of legitimate behavior (e.g., data points captured during the training period) that may be used to compute a probability that observed behavior (e.g., data points captured during a user session) may be considered legitimate. As described above, verification manager 110 may execute the machine learned model using a dynamic indicator as input. Here, the machine learned model may generate an output score indicating a likelihood, or probability, that a user of information handling system 100 is a verified user of information handling system 100. That is, the machine learned model may process the specific combination, or collection, of information describing each of the behavioral characteristics identified by verification manager 110 (i.e., unique to the user, or users, of information handling system 100) to generate an output score indicating a likelihood that a current user of information handling system 100 is indeed a verified user. If verification manager 110 determines that the output score is equal to, or above, a threshold output score, verification manager 110 may indicate that the dynamic indicator associated with the user is verified. For example, verification manager 110 may set a flag in dynamic inventory 120 indicating that the dynamic indicator stored therein has been verified and that the user may be trusted. In contrast, if verification manager 110 determines that the output score is below the threshold output score, verification manager 110 may indicate that the dynamic indicator is not verified and may cause one or more mitigating events to occur in information handling system 100. For example, verification manager 110 may cause various sensitive files and/or proprietary resources stored within, or otherwise made available through, information handling system 100 to be encrypted, or otherwise indecipherable, thereby disallowing access to users.

In one embodiment, verification manager 110 may determine a user accessibility associated with information handling system 100. In particular, verification manager 110 may determine a user accessibility for a user based on the static indicator and the dynamic indicator. Here, if verification manager 110 identifies that at least one of the static indicator and the dynamic indicator has not been verified, verification manager 110 may cause one or more mitigating events to occur in information handling system 100 as described above. In one embodiment, verification manager 110 may execute an encryption service to encrypt local storage resource 135 (i.e., a hard disk drive) of information handling system 100. For example, verification manager 110 may execute an Advanced Encryption Standard (AES) encryption service operable to implement a symmetric block cipher to protect sensitive files and/or proprietary resources stored within local storage resource 135. In another embodiment, verification manager 110 may cause information handling system 100 to restrict user access for the user, or users, for whom a dynamic indicator may not be verified. In contrast, if verification manager 110 identifies that the static indicator and the dynamic indicator have both been verified, verification manager 110 may cause information handling system 100 to allow user access for the user, or users, for whom a dynamic indicator has been successfully verified. In this way, verification manager 110 may ensure that, both, static parameters (i.e., one or more components installed on information handling system 100) and dynamic parameters (i.e., how a user interacts with, or otherwise provides input to, information handling system 100) are properly verified, thereby providing a holistic solution to cybersecurity issues encountered by conventional information handling systems that rely on user credentials alone.

FIG. 2 is a block diagram of selected elements of an embodiment of a computing environment that includes a plurality of information handling systems and a management backend. As shown in the embodiment illustrated in FIG. 2, information handling systems 100-1 through 100-N (collectively referred to herein as "information handling systems 100") may each be communicably coupled to management backend 150 via network 165. In addition, information handling systems 100-1 through 100-N may include verification managers 110-1 through 110-N (collectively referred to herein as "verification managers 110"), respectively. In the embodiment shown in FIG. 2, each information handling system 100-1 through 100-N may be similar to information handling system 100 as described above with respect to FIG. 1. Similarly, each verification manager 110-1 through 110-N may be similar to verification manager 110 as described above with respect to FIG. 1.

In the embodiment illustrated in FIG. 2, management backend 150 may verify, both, static indicators and dynamic indicators received from verification managers 110-1 through 110-N via network 165. In particular, verification managers 110 may each store respective static indicators in static inventory database 155. In one embodiment, the respective static indicators stored in static inventory database 155 may each include information describing a respective IP address for each of the information handling systems 100 in network 165. The static indicators stored in static inventory database 155 may each be verified (e.g., by an administrator or microservice of management backend 150) to yield a trusted inventory of the one or more components installed on, or otherwise available to, respective information handling systems 100. That is, static inventory database 155 may store a complete listing of verified static indicators associated with information handling systems 100 in computing environment 170. In addition, verification managers 110 may each store information describing behavioral characteristics in dynamic inventory database 160 of management backend 150. In this embodiment, each information handling system 100-1 through 100-N communicably coupled to management backend 150 via network 165 may store information describing behavioral characteristics in dynamic inventory database 160 such that dynamic inventory database 160 may store a complete inventory of behavioral characteristics associated with each user in computing environment 170. The dynamic indicators stored in dynamic inventory database 160 may be verified (e.g., by a machine learned model) to yield a trusted inventory of behavioral characteristics associated with each user of information handling system 100. That is, dynamic inventory database 160 may store a complete listing of verified users in computing environment 170.

In the embodiment illustrated in FIG. 2, if management backend 150 determines that a static indicator and/or dynamic indicator received from information handling system 100-1 through 100-N cannot be verified, management backend 150 may indicate that the static indicator and/or dynamic indicator are/is not verified and may cause one or more mitigating events to occur in the information handling system 100, or information handling systems 100, from which the static indicator and/or dynamic indicator was received. For example, management backend 150 may remotely cause various sensitive files and/or proprietary resources stored within, or otherwise made available through, the information handling system 100 to be encrypted, or otherwise indecipherable, thereby disallowing access to users. In another example, management backend 150 may remotely cause the information handling system 100 to restrict user access for the user, or users, for whom a dynamic indicator may not be verified.

FIG. 3 is a flowchart depicting selected elements of an embodiment of a method for verifying a user of an information handling system. It is noted that certain operations described in method 300 may be optional or may be rearranged in different embodiments.

Method 300 may begin at step 310, where a verification manager of an information handling system of a computing environment may identify one or more components of the information handling system. For example, verification manager 110 may access one or more components (e.g., hardware devices) installed on, or otherwise available to, information handling system 100 on a kernel level and may gather information describing various properties (e.g., device type, manufacturer, device description, and the like) associated with the one or more components as described above with respect to FIG. 1. Examples of information describing the one or more components may include information describing a basic input/output system (BIOS) serial number, a media access control (MAC) address associated with each of the one or more components, a graphics processing unit (GPU) serial number, an internet protocol (IP) address associated with information handling system 100, a random-access memory (RAM) part number, and/or any other information suitable for describing one or more components of information handling system 100. In step 320, the verification manager may generate a static indicator associated with the information handling system based on the one or more components. For example, verification manager 110 may generate a static indicator based on the gathered information describing one or more components of information handling system 100 as described above with respect to FIG. 1. In step 330, the verification manager may verify the static indicator. For example, verification manager 110 may access static inventory database 155 of management backend 150 to verify the static indicator as described above with respect to FIG. 1. In step 340, the verification manager may identify the user of the information handling system. For example, verification manager 110 may identify user credentials entered by a user, or users, of information handling system 100 as described above with respect to FIG. 1. Examples of user credentials entered by a user, or users, may be or include a password, biometric ID, RSA software token ID, and/or a username of the user, or users, logged in to information handling system 100. In step 350, the verification manager may identify behavioral characteristics associated with the user. For example, verification manager 110 may identify behavioral characteristics based on input captured by peripheral device 145 as described above with respect to FIG. 1. In step 360, the verification manager may generate a dynamic indicator associated with the user based on the behavior characteristics. For example, verification manager 110 may generate a dynamic indicator based on the behavioral characteristics associated with the user as described above with respect to FIG. 1. In step 370, the verification manager may verify the dynamic indicator. For example, verification manager 110 may execute a machine learned model using the dynamic indicator as input as described above with respect to FIG. 1. The machine learned model may have been previously trained by verification manager 110 during a training period spanning a given time interval (e.g., two weeks, one month, one year, and the like) and may generate an output score indicating a likelihood, or probability, that a user of information handling system 100 is a verified user of information handling system 100. In step 380, the verification manager may determine a user accessibility associated with the information handling system based on the static indicator and the dynamic indicator. For example, if verification manager 110 identifies that at least one of the static indicator and the dynamic indicator has not been verified, verification manager 110 may cause one or more mitigating events to occur in information handling system 100 as described above with respect to FIG. 1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for verifying a user of an information handling system, the method comprising:

training, by a verification manager of an information handling system of a computing environment, a machine learned model based on monitored interactions of a user with the information handling system over a first time period, the interactions including at least keystrokes received from the user via a keyboard of the information handling system and movements and clicks received from the user via a computer mouse of the information handling system, the keystroke interactions including a first set of words and phrases;

identifying, by the verification manager, properties associated with one or more components of the information handling system, the properties including an Internet Protocol (IP) address of the information handling system,, and for a processor component of the information handling system, the properties include a cache size, a clock speed, a serial number, a socket type, and a host-bus speed, and for a memory component of the information handling system, the properties include a storage capacity, a data access performance, a physical form factor, and a serial number;

generating, by the verification manager, a static indicator associated with the information handling system based on a specific combination of the properties associated with the one or more components, including the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component;

verifying, by the verification manager, the static indicator, including determining that the specific combination of the i) IP address of the information handling system, ii) the cache size, the clock speed, the serial number, the socket type, and the host-bus speed of the processor component, and iii) the storage capacity, the data access performance, the physical form factor, and the serial number of the memory component of the static indictor matches the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component of a previously verified static indictor;

identifying, by the verification manager, the user of the information handling system;

identifying, by the verification manager and at a second time after the first time period, a plurality of behavioral characteristics associated with the user, including:
  identifying, by the verification manager, additional keystrokes received from the user via the keyboard of the information handling system, the additional keystroke interactions including a second set of words and phrases;
  identifying, by the verification manager, additional movements and clicks received from the user via the computer mouse of the information handling system;

generating, by the verification manager, a dynamic indicator associated with the user based on the plurality of behavioral characteristics, including generating the dynamic indicator associated with the user based on both i) the keystrokes of the keyboard and i) the movement and clicks of the computer mouse;

generating, by the verification manager executing the machine learned model, an output score indicating a probability that the user is a verified user of the information handling system based on a comparison of the monitored interactions of the user over the first time period and the plurality of behavioral characteristics associated with the user identified at the second time, including a comparison of i) the first set of words and phrases and ii) the second set of words and phrases to determine a commonality between the first set and the second set;

determining, by the verification manager, that the output score is above a threshold output score; and indicating, by the verification manager, that the dynamic indicator is verified;

determining, by the verification manager, a user accessibility associated with the information handling system based on the static indicator and the dynamic indicator.

2. The method of claim 1, wherein verifying the static indicator comprises:
  accessing, by the verification manager, a static inventory database of a management backend of the computing environment, the static inventory database storing a plurality of verified static indicators associated with a plurality of information handling systems of the computing environment;
  identifying, by the verification manager, the previously verified static indicator associated with the information handling system from the plurality of verified static indicators, the previously verified static indicator indicating a plurality of verified components of the information handling system, including the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component;
  determining, by the verification manager, that the static indicator matches the verified static indicator; and
  indicating, by the verification manager, that the static indicator is verified.

3. The method of claim 1, further including:
  determining, by the verification manager, that the output score is below a threshold output score;
  indicating, by the verification manager, that the dynamic indicator is not verified; and
  executing, by the verification manager, an encryption service to encrypt a local storage resource of the information handling system.

4. The method of claim 1, wherein determining the user accessibility associated with the information handling system based on the static indicator and the dynamic indicator comprises:
  identifying, by the verification manager, that the static indicator and the dynamic indicator have been verified; and
  causing, by the verification manager, the information handling system to allow a user access for the user.

5. The method of claim 1, wherein determining the user accessibility associated with the information handling system based on the static indicator and the dynamic indicator comprises:
  identifying, by the verification manager, that at least one of the static indicator and the dynamic indicator has not been verified; and
  causing, by the verification manager, the information handling system to restrict a user access for the user.

6. One or more computer-readable non-transitory storage media embodying software that is operable when executed to:
  train, by a verification manager of an information handling system of a computing environment, a machine learned model based on monitored interactions of a user with the information handling system over a first time period, the interactions including at least keystrokes received from the user via a keyboard of the information handling system and movements and clicks received from the user via a computer mouse of the information handling system, the keystroke interactions including a first set of words and phrases;
  identify, by verification manager, properties associated with one or more components of the information handling system, the properties including an Internet Protocol (IP) address of the information handling system, and for a processor component of the information handling system, the properties include a cache size, a clock speed, a serial number, a socket type, and a host-bus speed, and for a memory component of the information handling system, the properties include a storage capacity, a data access performance, a physical form factor, and a serial number;
  generate, by the verification manager, a static indicator associated with the information handling system based on a specific combination of the properties associated with the one or more components, including the specific combination of i) the IP address, ii) the cache size, the clock speed, the serial number, the socket type, and the host-bus speed of the processor component, and iii) the storage capacity, the data access performance, the physical form factor, and the serial number of the memory component;
  verify, by the verification manager, the static indicator, including determining that the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component of the static indictor matches the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component of a previously verified static indictor;

identify, by the verification manager, a user of the information handling system;
  identify, by the verification manager and at a second time after the first time period, a plurality of behavioral characteristics associated with the user, including:
    identify, by the verification manager, additional keystrokes received from the user via the keyboard of the information handling system, the additional keystroke interactions including a second set of words and phrases;
  identify, by the verification manager, additional movements and clicks received from the user via the computer mouse of the information handling system;
  generate, by the verification manager, a dynamic indicator associated with the user based on the plurality of behavioral characteristics, including generate the dynamic indicator associated with the user based on both i) the keystrokes of the keyboard and i) the movement and clicks of the computer mouse;
  generate, by the verification manager executing the machine learned model, an output score indicating a probability that the user is a verified user of the information handling system based on a comparison of the monitored interactions of the user over the first time period and the plurality of behavioral characteristics associated with the user identified at the second time, including a comparison of i) the first set of words and phrases and ii) the second set of words and phrases to determine a commonality between the first set and the second set;
  determine, by the verification manager, that the output score is above a threshold output score; and
  indicate, by the verification manager, that the dynamic indicator is verified;
determine, by the verification manager, a user accessibility associated with the information handling system based on the static indicator and the dynamic indicator.

7. The media of claim 6, wherein to verify the static indicator, the software is further operable when executed to:
  access, by the verification manager, a static inventory database of a management backend of the computing environment, the static inventory database storing a plurality of verified static indicators associated with a plurality of information handling systems of the computing environment;
  identify, by the verification manager, the previously verified static indicator associated with the information handling system from the plurality of verified static indicators, the previously verified static indicator indicating a plurality of verified components of the information handling system, including the specific combination of i) the IP address a of the information handling system, ii) the cache size, the clock speed, the serial number, the socket type, and the host-bus speed of the processor component, and iii) the storage capacity, the data access performance, the physical form factor, and the serial number of the memory component;
  determine, by the verification manager, that the static indicator matches the verified static indicator; and
  indicate, by the verification manager, that the static indicator is verified.

8. The media of claim 6, the software is further operable when executed to:
  determine, by the verification manager, that the output score is below a threshold output score;
  indicate, by the verification manager, that the dynamic indicator is not verified; and
  execute, by the verification manager, an encryption service to encrypt a local storage resource of the information handling system.

9. The media of claim 6, wherein to determine the user accessibility associated with the information handling system based on the static indicator and the dynamic indicator, the software is further operable when executed to:
  identify, by the verification manager, that the static indicator and the dynamic indicator have been verified; and
  cause, by the verification manager, the information handling system to allow a user access for the user.

10. The media of claim 6, wherein to determine the user accessibility associated with the information handling system based on the static indicator and the dynamic indicator, the software is further operable when executed to:
  identify, by the verification manager, that at least one of the static indicator and the dynamic indicator has not been verified; and
  cause, by the verification manager, the information handling system to restrict a user access for the user.

11. A computing environment, comprising:
  an information handling system including one or more processors; and
  one or more computer-readable non-transitory storage media coupled to one or more of the processors and comprising instructions operable when executed by one or more of the processors to cause the system to:
    train, by a verification manager of an information handling system of a computing environment, a machine learned model based on monitored interactions of a user with the information handling system over a first time period, the interactions including at least keystrokes received from the user via a keyboard of the information handling system and movements and clicks received from the user via a computer mouse of the information handling system, the keystroke interactions including a first set of words and phrases;
    identify, by the verification manager, properties associated with one or more components of the information handling system, the properties including an Internet Protocol (IP) address of the information handling system, and for a processor component of the information handling system, the properties include a cache size, a clock speed, a serial number, a socket type, and a host-bus speed, and for a memory component of the information handling system, the properties include a storage capacity, a data access performance, a physical form factor, and a serial number;
    generate, by the verification manager, a static indicator associated with the information handling system based on a specific combination of the properties associated with the one or more components, including the specific combination of i) the IP address, ii) the cache size, the clock speed, the serial number, the socket type, and the host-bus speed of the processor component, and iii) the storage capacity, the data access performance, the physical form factor, and the serial number of the memory component;

verify, by the verification manager, the static indicator, including determining that the specific combination of i) the IP address of the information handling system, ii) the cache size, the clock speed, the serial number, the socket type, and the host-bus speed of the processor component, and iii) the storage capacity, the data access performance, the physical form factor, and the serial number of the memory component of the static indictor matches the specific combination of the i) IP address of the information handling system, ii) the cache size, the clock speed, the serial number, the socket type, and the host-bus speed of the processor component, and iii) the storage capacity, the data access performance, the physical form factor, and the serial number of the memory component of a previously verified static indictor;

identify, by the verification manager, a user of the information handling system;

identify, by the verification manager and at a second time after the first time, a plurality of behavioral characteristics associated with the user, including:
   identify, by the verification manager, additional keystrokes received from the user via the keyboard of the information handling system, the additional keystroke interactions including a second set of word and phrases;
   identify, by the verification manager, additional movements and clicks received from the user via the computer mouse of the information handling system;

generate, by the verification manager, a dynamic indicator associated with the user based on the plurality of behavioral characteristics, including generate the dynamic indicator associated with the user based on both i) the keystrokes of the keyboard and i) the movement and clicks of the computer mouse;

generate, by the verification manager executing the machine learned model, an output score indicating a probability that the user is a verified user of the information handling system based on a comparison of the monitored interactions of the user over the first time period and the plurality of behavioral characteristics associated with the user identified at the second time, including a comparison of i) the first set of words and phrases and ii) the second set of words and phrases to determine a commonality between the first set and the second set;

determine, by the verification manager, that the output score is above a threshold output score; and indicate, by the verification manager, that the dynamic indicator is verified;

determine, by the verification manager, a user accessibility associated with the information handling system based on the static indicator and the dynamic indicator.

12. The computing environment of claim 11, wherein to verify the static indicator, the processors are further operable when executed to:

access, by the verification manager, a static inventory database of a management backend of the computing environment, the static inventory database storing a plurality of verified static indicators associated with a plurality of information handling systems of the computing environment;

identify, by the verification manager, the previously verified static indicator associated with the information handling system from the plurality of verified static indicators, the previously verified static indicator indicating a plurality of verified components of the information handling system, including the specific combination of the IP address of the information handling system, ii) the cache size, the clock speed, the serial number, the socket type, and the host-bus speed of the processor component, and iii) the storage capacity, the data access performance, the physical form factor, and the serial number of the memory component;

determine, by the verification manager, that the static indicator matches the verified static indicator; and indicate, by the verification manager, that the static indicator is verified.

13. The computing environment of claim 11, the processors are further operable when executed to:

determine, by the verification manager, that the output score is below a threshold output score;

indicate, by the verification manager, that the dynamic indicator is not verified; and execute, by the verification manager, an encryption service to encrypt a local storage resource of the information handling system.

14. The computing environment of claim 11, wherein to determine the user accessibility associated with the information handling system based on the static indicator and the dynamic indicator, the processors are further operable when executed to:

identify, by the verification manager, that the static indicator and the dynamic indicator have been verified; and cause, by the verification manager, the information handling system to allow a user access for the user.

* * * * *